(12) United States Patent
Delmerico et al.

(10) Patent No.: US 7,680,562 B2
(45) Date of Patent: Mar. 16, 2010

(54) POWER GENERATION SYSTEM

(75) Inventors: Robert William Delmerico, Clifton Park, NY (US); Alfredo Sebastian Achilles, Bavaria (DE)

(73) Assignee: General Electric Company, Niskayuna, NY (US)

( * ) Notice: Subject to any disclaimer, the term of this patent is extended or adjusted under 35 U.S.C. 154(b) by 43 days.

(21) Appl. No.: 11/221,473

(22) Filed: Sep. 8, 2005

(65) Prior Publication Data

US 2007/0055408 A1 Mar. 8, 2007

(51) Int. Cl.
G05D 11/00 (2006.01)

(52) U.S. Cl. .................. 700/297; 700/287
(58) Field of Classification Search .......... 700/286, 700/297, 298, 287, 290, 295
See application file for complete search history.

(56) References Cited

U.S. PATENT DOCUMENTS

| | | | |
|---|---|---|---|
| 5,798,633 A * | 8/1998 | Larsen et al. | 323/207 |
| 6,175,217 B1 * | 1/2001 | Da Ponte et al. | 322/19 |
| 6,693,409 B2 * | 2/2004 | Lynch et al. | 323/208 |
| 6,693,809 B2 | 2/2004 | Engler | |
| 7,015,597 B2 * | 3/2006 | Colby et al. | 307/31 |
| 2004/0051387 A1 | 3/2004 | Lasseter et al. | |
| 2004/0124812 A1 | 7/2004 | Delmerico et al. | |
| 2004/0260489 A1 * | 12/2004 | Mansingh et al. | 702/60 |
| 2005/0107892 A1 * | 5/2005 | Matsui et al. | 700/28 |
| 2005/0225400 A1 * | 10/2005 | Yoneya | 331/57 |
| 2006/0229768 A1 * | 10/2006 | Chassin et al. | 700/295 |

* cited by examiner

*Primary Examiner*—Kidest Bahta
*Assistant Examiner*—Nathan Laughlin
(74) *Attorney, Agent, or Firm*—Ann M. Agosti

(57) ABSTRACT

A power generation system includes a converter configured for supplying power from a constrained power or energy source to a power network and a control system configured for balancing instantaneously available power from the constrained source against demanded load from the power network by dynamically adjusting power network voltage, power network frequency, or a combination of power network voltage and power network frequency.

8 Claims, 7 Drawing Sheets

POWER GENERATION SYSTEM

BACKGROUND

The invention relates generally to power generation systems and more particularly to systems configured for supplying power from constrained power or energy sources.

Small and medium size generators are increasingly being considered for use in distribution networks because of the changing regulatory and market environment and because of the potential for energy savings and service improvements which may result from such use. A strong interest also exists in distributed generator (DG) systems that provide backup power capability and grid independent operation.

Grid independent operation occurs when a system of generators operates independently of the bulk power system to deliver power to loads at nominal voltage and frequency within an acceptable tolerance band. Grid independent operation can be extremely challenging for DG systems supplying dynamic loads such as motors, especially when non-conventional generators such as fuel cells, wind turbines, microturbines, or batteries, for example, are coupled with power electronic converters having limited current handling capability and no contribution to system inertia. In a traditional power system, when load demands are suddenly increased, the power required to support the load is instantly provided by the system inertia. The output of the power source is then increased to satisfy the load. For this reason, grid independent systems with limited or no physical inertia to support changing load conditions are difficult to operate successfully.

A mini-grid is a power system where a diverse set of local generation assets and controls are integrated to satisfy local loads. A mini-grid can be operated in a grid connected or islanded mode.

The voltage strength of a node in an AC power system where a mini-grid is connected can be estimated using the Short Circuit Ratio (SCR). SCR is defined as $S_{sc}$ divided by $S_{MG}$ wherein, $S_{sc}$ is the three-phase short circuit power at the node of connection when the mini-grid is disconnected (expressed in kVA), and $S_{MG}$ is the sum of the apparent power rating of the generation and energy storage equipment in the mini-grid (expressed in kVA). A node of a power system is defined to be weak if the SCR is less than 3.

The frequency strength of a power system can be estimated using the following ratio: $H_{sys}$ divided by $P_{MG}$, wherein $H_{sys}$ is the rotational stored energy of the power system (expressed in kW·s); $P_{MG}$ is the sum of the active power rating of the generation and energy storage equipment in the mini-grid (Expressed in kW). A power system is defined to be weak if this ratio is less than 5 s.

It is desirable to have the capability to operate dynamic loads with constrained generation resources in weak or isolated grid networks and more specifically in low inertia mini-grid networks.

BRIEF DESCRIPTION

If a power or energy source is power or rate limited in an isolated system with low inertia, it may not be possible to maintain dynamic power balance between source and load during system disturbances unless the demands of the load can be reduced. Fortunately many system loads have a natural tendency to decrease power demand as a function of voltage, frequency, or both. Therefore, by allowing the system frequency, voltage, or both to transiently droop, power balance can be maintained. In some cases this will allow the available generation to be used to its maximum potential, resulting in minimal equipment cost consistent with the power quality requirements of the application.

Briefly, in accordance with one embodiment of the present invention, a power generation system comprises a converter configured for supplying power from a constrained power or energy source to a power network and a control system configured for balancing instantaneously available power from the constrained source against demanded load from the power network by dynamically adjusting power network voltage, power network frequency, or a combination of power network voltage and power network frequency.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
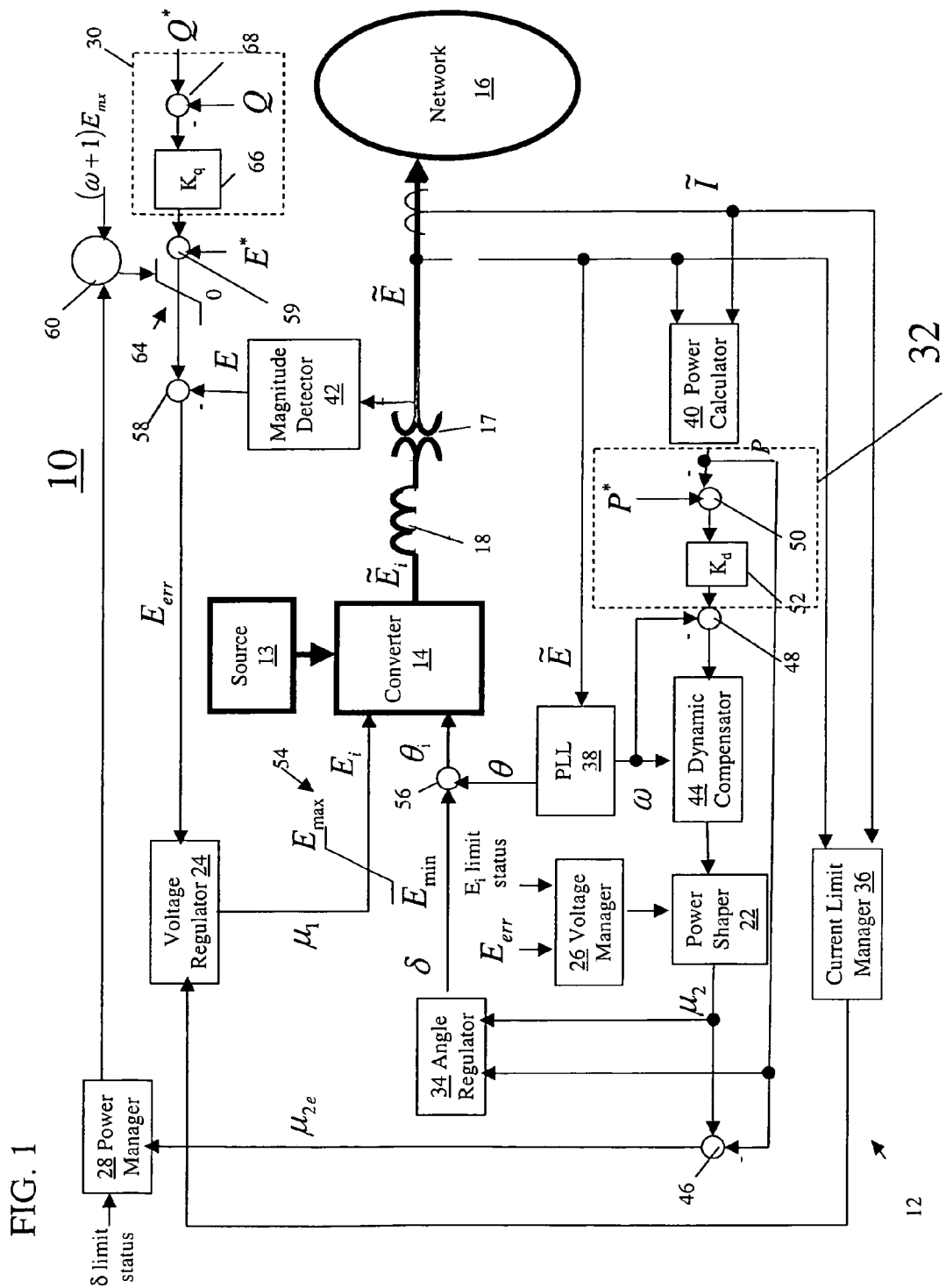
FIG. 1 is a block diagram of a power generation system in accordance with one embodiment wherein a voltage based control system is implemented.

FIG. 1 is a block diagram of a power generation system in accordance with one embodiment wherein a power generation system 10 comprises a converter 14 configured for supplying power from a constrained power or energy source 13 to a power network 16, and a control system 12 configured for balancing instantaneously available power from the constrained source against demanded load from the power network by dynamically adjusting power network voltage, power network frequency, or a combination of power network voltage and power network frequency. The power connections are shown simply with single lines, but typically three phase power is used. As used herein, "instantaneously available power" means the maximum power available at any instant of time, and "constrained source" means a power or energy source that is inherently limited in dynamic response and power magnitude (that is, not always able to supply the instantaneous power requirements of the network).

Converter 14 may comprise any configuration for converting power from constrained source 13 for use by network 16. In one example, converter 14 comprises a power electronic inverter that changes direct-current (DC) power from a power source, such as a fuel cell, to alternating-current (AC) power. A typical converter 14 includes a plurality of solid-state, electronically controllable switches connected to a network 16 with at least one transformer 17, or one reactor 18, or both.

The solid-state switches in the converter 14 respond to control signals so as to create an AC output, adjustable in magnitude, phase angle and frequency; which is coupled through transformer 17, or reactor 18, or both, to network 16.

Figure 2:
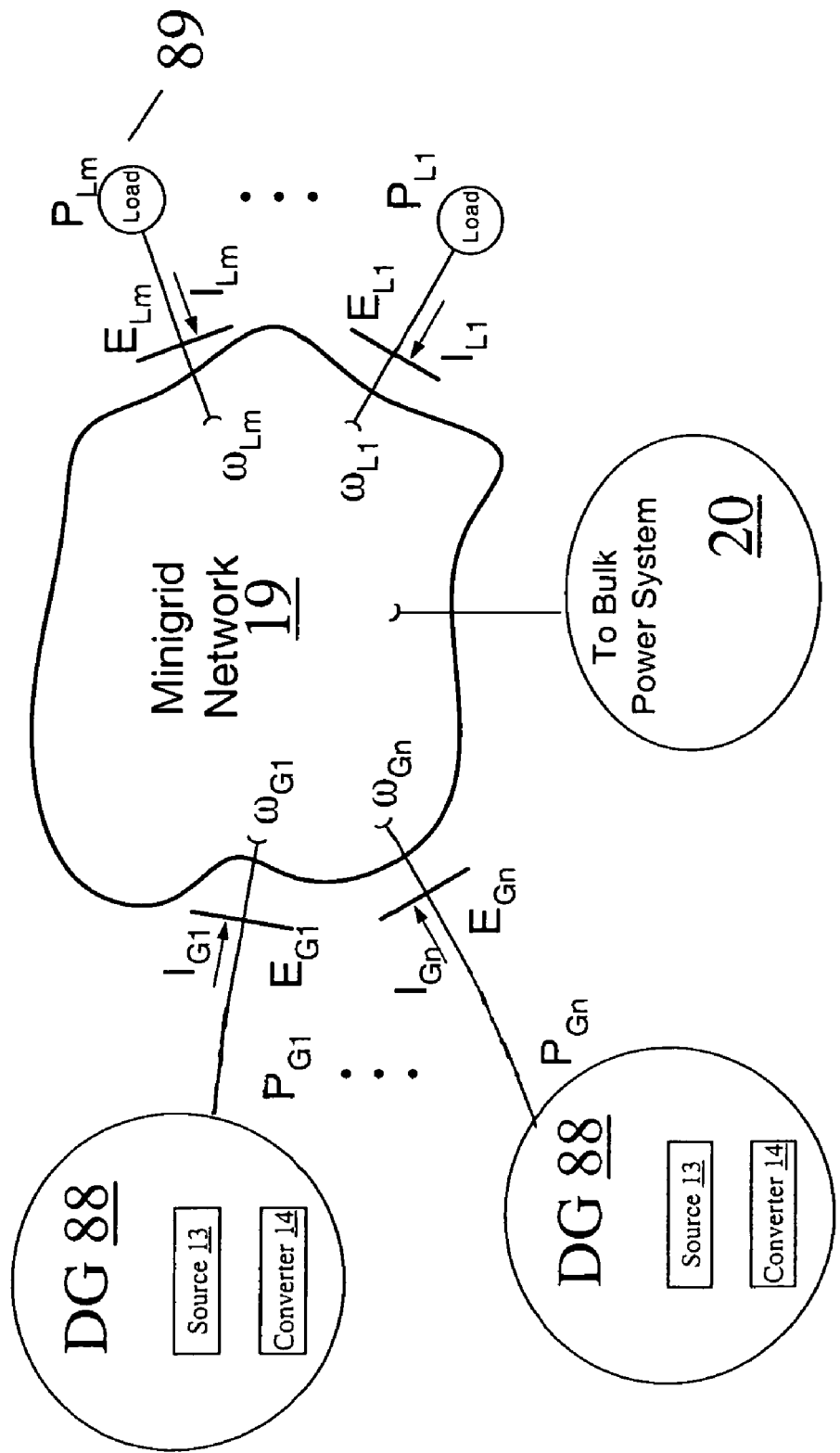
FIG. 2 is a diagram of a mini-grid coupled to a bulk power system.

Typically the power network comprises a mini-grid 19 which may be further connected to a bulk power system 20 as illustrated in FIG. 2. As is also shown in FIG. 2, in one embodiment, the power generation system comprises a plurality of distributed generators 88 each comprising a converter 14, a constrained source 13, and an independent control system 12. Each converter AC output is configured for being controlled by a respective one of the control systems. With or without multiple converters, in some embodiments the power network is coupled to multiple loads 89.

As more specifically shown in the embodiments of FIGS. 1 and 3-5, the control system is optionally configured as a voltage based control system 10 or 110. As used herein, voltage based control system means the primary converter control parameter is AC terminal voltage including a magnitude command ($E_i$) and a phase angle command ($\theta_i$).

Referring to FIG. 1, one aspect of control system 12 comprises a power shaper 22 configured to implement a power limit and a ramp-rate limit consistent with the capability of constrained source 13 and to provide a power command $\mu_2$. Control system 12 may further comprise an angle regulator 34 configured for receiving the power command and a network calculated power P (shown as being obtained by power calculator 40) and generating an adjustment angle $\delta$ for adjusting a voltage phase angle command $\theta_i$ of converter 14. Power command $\mu_2$ is used by angle regulator 34 to enforce power and ramp-rate limits compatible with constrained source 13.

Control system 12 typically further comprises a phase locked loop 38 configured for obtaining an angle estimation $\theta$ for following measured network voltage $\tilde{E}$ with minimal steady state error. In such embodiments, voltage angle estimation $\theta$ can be combined with adjustment angle $\delta$ at summation element 56 to obtain the voltage phase angle command $\theta_i$ for converter 14.

The phase locked loop may be further configured for obtaining an offset frequency estimation $\omega$ and providing offset frequency estimation $\omega$ to power shaper 22. Offset frequency estimation $\omega$ may be supplied directly to power shaper 22 or, as shown, through an optional dynamic compensator 44. Dynamic compensator 44 is configured to stabilize phase locked loop 38 when connected to weak grids or impedance networks.

In one embodiment, control system 12 is configured for obtaining a frequency droop signal from element 32 and further comprises a subtractor 48 for subtracting offset frequency estimation $\omega$ from the frequency droop signal and providing the result as an input to dynamic compensator 44. More specifically, in this embodiment, calculated network power P is subtracted from a power set point P* at subtractor 50 and a gain $K_d$ is applied to the difference at gain element 52. The output signal of gain element 52 is directed to subtractor 48. Power set point P*, as well as other set points described herein, can be governed by a supervisory control system (not shown). The magnitude of gain element 52, as well as the other gain elements shown herein, will vary according to each specific system implementation but can readily be calculated through modeling, empirical testing, or combinations thereof. Frequency droop control is beneficial for facilitating load balance between distributed generators.

Control system 12 typically also comprises a voltage regulator 24 configured to provide a terminal voltage magnitude command $E_i$ to converter 14 and to limit current in converter 14 by managing the voltage drop across the transformer 17, reactor 18, or both. In one example, a current limit manager 36 uses measured voltage ($\tilde{E}$) being supplied to the network and measured current ($\tilde{I}$) from the network to provide voltage limits $E_{max}$ and $E_{min}$ for use by voltage regulator 24. One design of a current management embodiment can be found in U.S. Pat. No. 5,798,633, for example.

In some embodiments, control system 12 further comprises a power manager 28 configured to reduce the terminal voltage magnitude when the calculated power P cannot be driven to the power command $\mu_2$. Subtractor 46 provides power manager 28 with an input signal representative of the power command $\mu_2$ minus calculated power P. Element 60, as shown in FIG. 1, can be used to combine an output signal of power manager 28 with a signal representative of a frequency (1+$\omega$) of the network multiplied by a maximum set point $E_{mx}$ and for supplying the result for use by voltage regulator 24. In one example, the result is supplied to a limiter 64 to limit the maximum voltage value sent to voltage regulator 24 (to maintain a maximum voltage to frequency ratio).

In an even more specific embodiment, control system 12 further comprises a voltage droop signal element 30 and a summation element 59 for adding the voltage droop signal to the voltage set point E*. Element 30 typically comprises a subtractor 68 for subtracting a reactive power calculation Q (from power calculator 40) from a reactive power set point Q* and gain element 66 for applying a gain $K_q$. The result is added to voltage set point E* at summation element 59 before being subjected to limiter 64. In a more specific embodiment, a magnitude detector 42 is used to obtain a voltage magnitude value E from the voltage $\tilde{E}$ measured at the connection with network 16. Voltage magnitude value E is in turn subtracted from the limited output signal of element 64 which is then supplied as an error voltage signal $E_{err}$ to voltage regulator 24.

Figure 3:
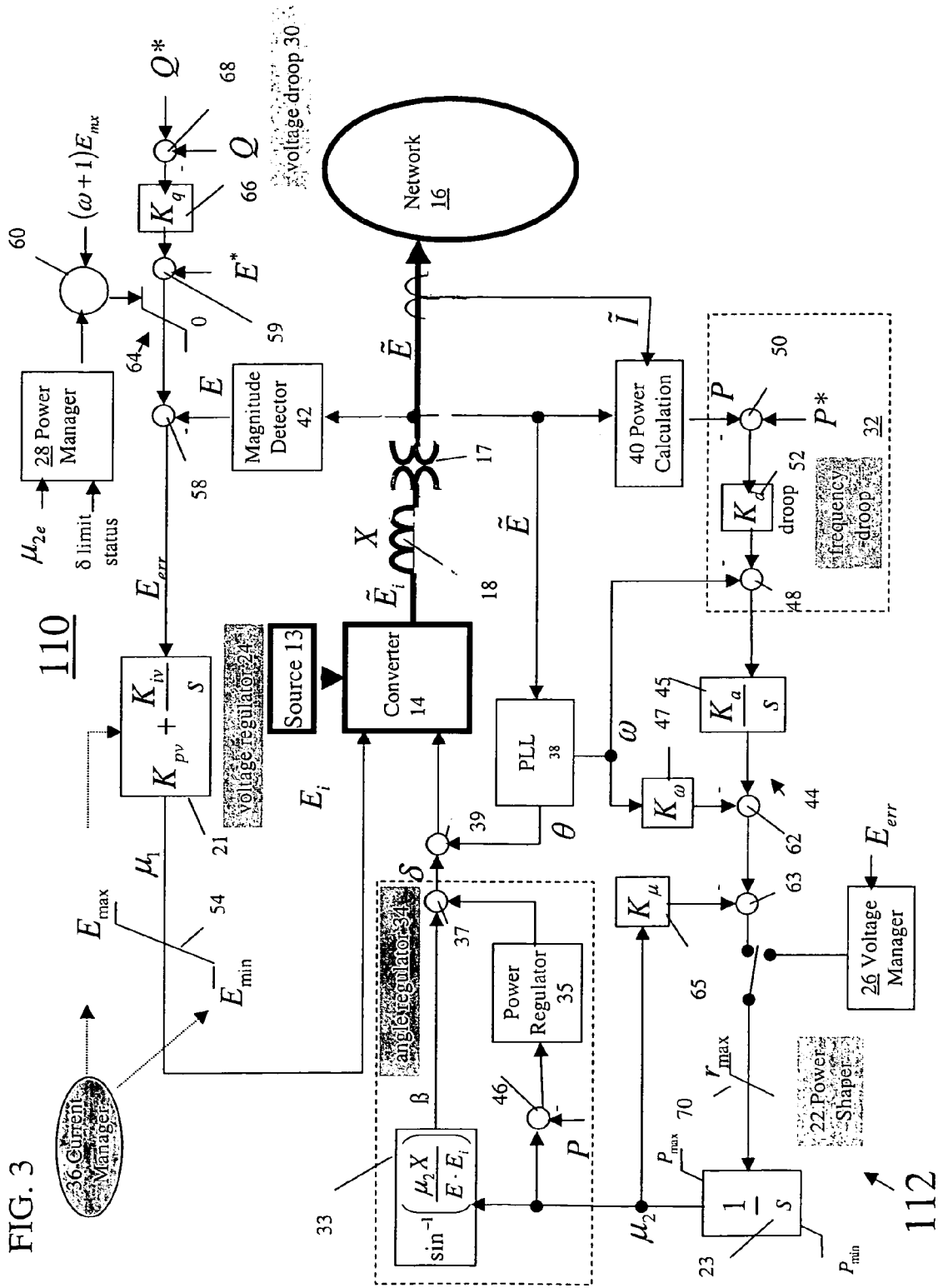
FIG. 3 is a block diagram of a power generation system in accordance with a more specific voltage based control system embodiment.

FIG. 3 is a block diagram of a power generation system in accordance with several more specific voltage based control system embodiments. In one embodiment, for example, voltage regulator 24 comprises a proportional integral controller 21 and a limiter 54. If the output signal from PI controller 21 is outside the limits of the current limit manager 36, the integrator of PI controller 21 can be temporarily frozen to prevent wind-up of voltage regulator 24 (until Eerr absolute value decreases to the point that $\mu_1$ is within the bounds of limiter 54).

In the dynamic compensator 44 example of FIG. 3, the output signal from subtractor 48 is supplied to an integrating gain element 45 before having a gain adjusted frequency (via gain element 47) being subtracted therefrom at element 62 to provide an output signal of the dynamic compensator.

In the power shaper 22 example of FIG. 3, the power command $\mu_2$ is adjusted with gain element 65 before being subtracted from the output signal of dynamic compensator 44 at subtractor 63. The result passes through a power rate limiter 70 and then through an limited integrator 23 to obtain the power command $\mu_2$.

FIG. 3 additionally illustrates an embodiment wherein control system 12 further comprises a voltage manager 26 that reduces power command $\mu_2$ when measured terminal voltage magnitude E cannot be driven to voltage set point E*. In such situations, power shaper 22 receives the power shaper's input signal from voltage manager 26 rather than from dynamic compensator 44 and can be described as being operating in a "voltage support" or "sacrificing power" mode. It is most effective to freeze any bypassed integrators, such as element 45 in this example.

FIG. 3 additionally illustrates an embodiment wherein a feed forward command at element 33 uses power command $\mu_2$ and voltage magnitude across known reactance (X) of reactor 18 and/or transformer 17 to obtain an estimate of the adjustment angle β required to generate the commanded power $\mu_2$. Because angle β is only an estimate, an additional power regulator 35 is used to ensure that the commanded power is generated. In the embodiment of FIG. 3, the difference between calculated power P and power command $\mu_2$ is obtained at subtractor 46 and passed through power regulator 35 before being added to estimated adjustment angle β to obtain adjustment angle δ.

If the network contains only impedance or constant power loads, then the angle of the terminal voltage Ẽ is determined by the load and not the control. For this type of load, the frequency stability of the resulting system will depend primarily on phase locked loop 38, dynamic compensator 44 and power shaper 22.

Figure 4:
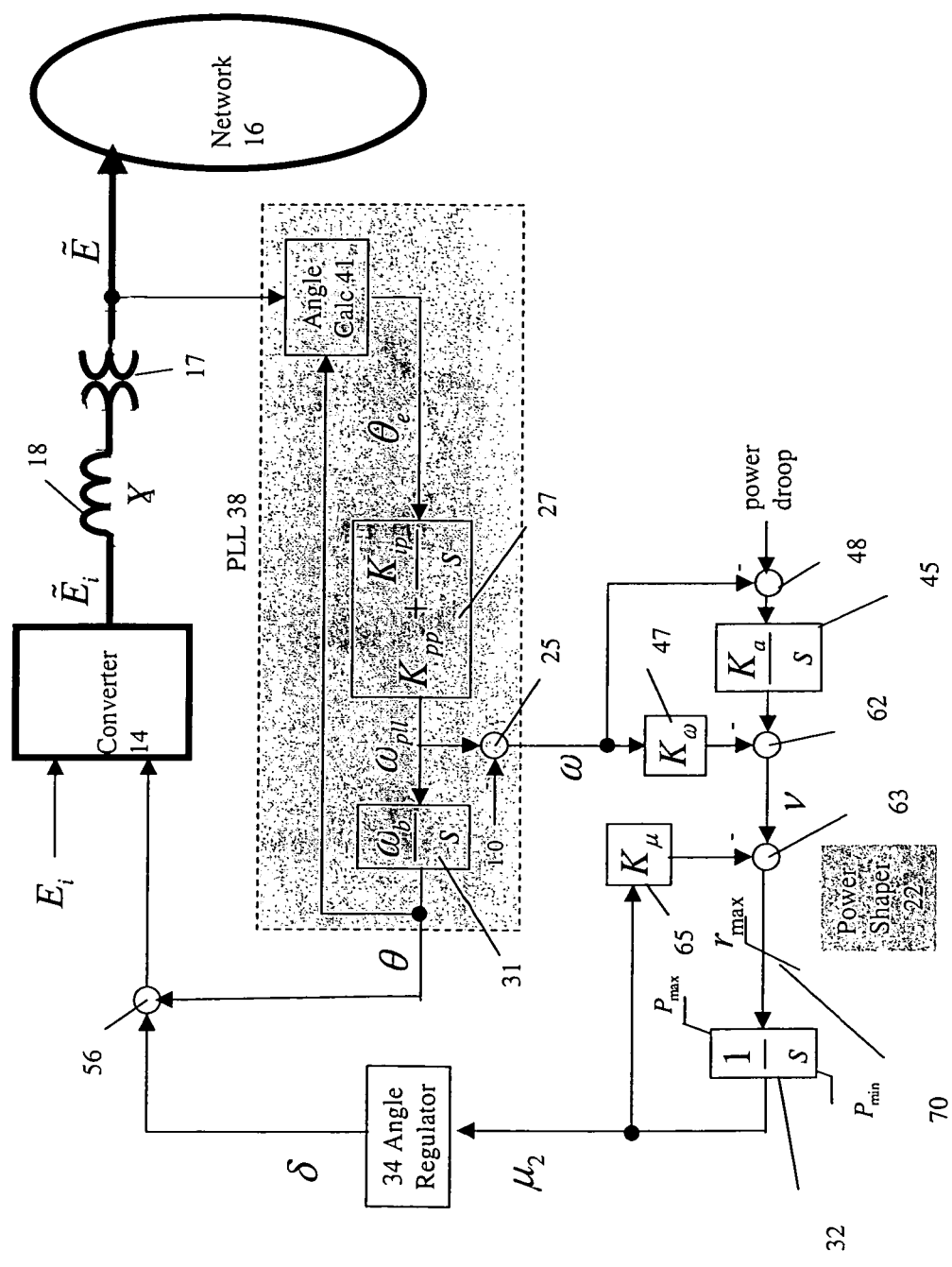
FIG. 4 is a block diagram illustrating a more specific aspect of a phase locked loop implementation in the power generation system of FIG. 3.

FIG. 4 is a block diagram illustrating a more specific aspect of a phase locked loop 38 implementation in the power generation system of FIG. 3. During design of a typical converter, the designer usually assumes that the network will be large and that the system frequency will move slowly as a function of network inertia. However, this paradigm often does not work for small grid-independent systems where the inertia is small or perhaps non-existent. For low-inertia systems, the phase locked loop dynamics are important for system stability.

The phase locked loop embodiment of FIG. 4 further illustrates an angle calculator 41 for obtaining an angle estimate $\theta_e$. In the example of FIG. 4, the angle estimate $\theta_e$ is applied to a proportional integral controller 27 (to obtain the frequency $\omega_{pll}$) and an integral gain element 31 (to obtain the phase locked loop angle θ). Under nominal conditions $\omega_{pll}$ is 1.0 and angle θ is a ramp for use with the firing circuit (not shown) of converter 14. At subtractor 25, $\omega_{pll}$ is subtracted from the value 1.0 to generate the offset frequency ω. The loop formed by the dynamic compensator, power shaper, and phase locked loop, or, more specifically, elements 41, 27, 31, 25, 47, 62, 48, 45, 63, 70, 32, 34, and 56 has the function of maintaining frequency even with low or no inertia. FIG. 4 illustrates a phase locked loop embodiment which has been simplified to focus on fundamental behavior. Typically, in a fully implemented three-phase system, the phase locked loop design will be additionally adjusted to consider the effects of system unbalance and harmonics. With respect to phase locked loops generally, two useful references are Guan-Chyun Hsieh and James C Hung, "Phase-Locked Loop Techniques—A Survey," IEEE Transactions on Industrial Electronics, vol. 43, no. 6, pp 609-615, December 1996, and B. K. Bose, "Power Electronics and AC Drives," Prentice-Hall, ISBN 0-13-686882-7 025, 1986.

Figure 5:
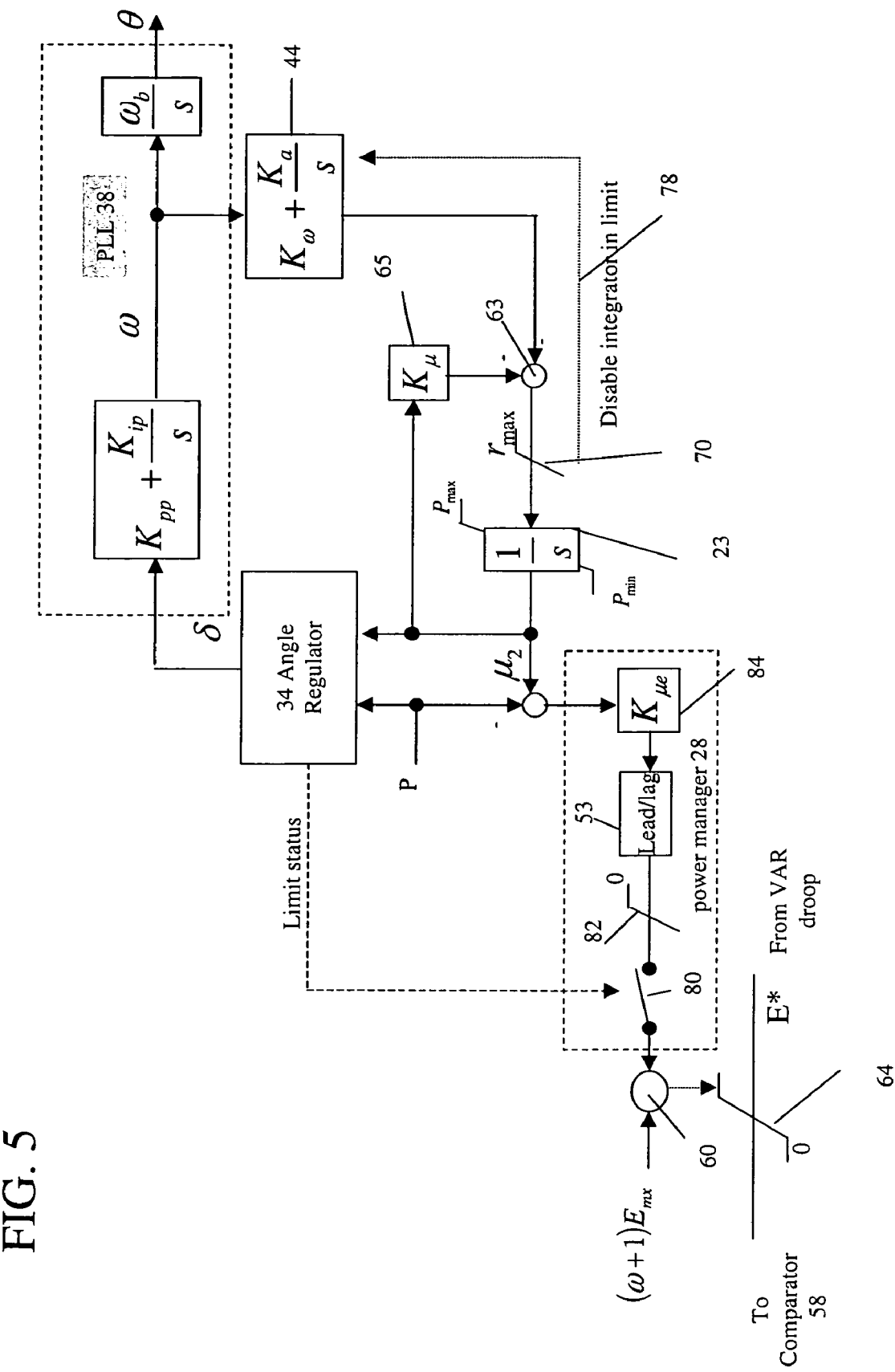
FIG. 5 is a block diagram illustrating a more specific aspect of a voltage loop power management implementation in the power generation system of FIG. 3.

FIG. 5 is a block diagram illustrating a more specific aspect of a voltage loop power management implementation in the power generation system of FIG. 3. To control power delivered to the load, when control for voltage angle δ is inadequate, the voltage is appropriately adjusted. In the embodiment of FIG. 5, to help transiently balance power, power manager 28 of FIG. 1 comprises a gain element 84, a lead/lag element 53, a switch element 80, and a limiter 82. The voltage reference limit of limiter 64 is reduced if the difference between power command $\mu_2$ and calculated power P is not satisfied.

Figure 6:
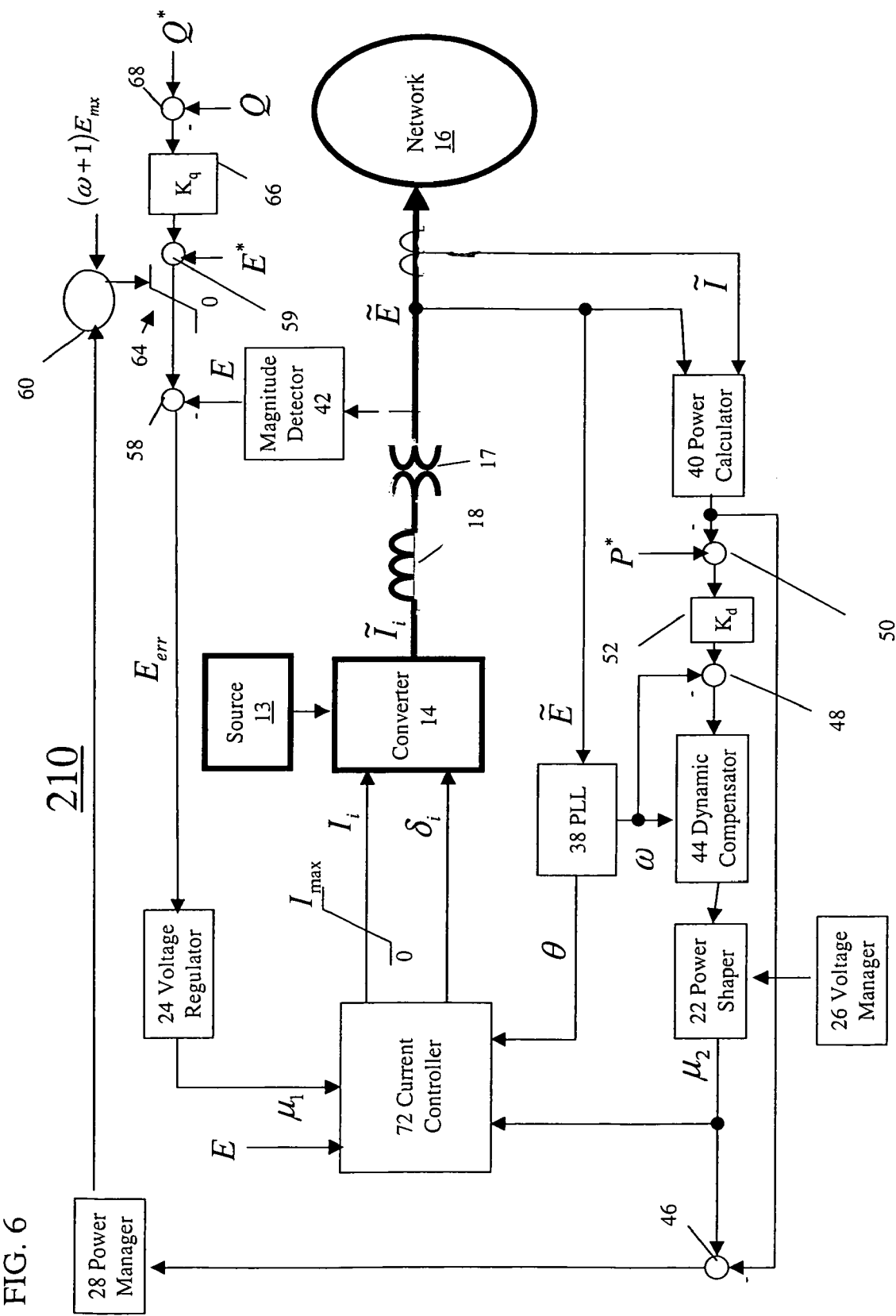
FIG. 6 is a block diagram of a power generation system in accordance with another embodiment wherein a current based control system is implemented.

FIG. 6 is a block diagram of a power generation system in accordance with another embodiment wherein a current based control system is implemented. As used herein, current based control system means the primary converter control parameter is converter output current including a current magnitude command $I_i$ and phase angle command $\delta_i$. As can be seen from FIG. 6, the current based control system has many similarities to the voltage control system with one difference being that the current based control system comprises a current controller 72 configured for receiving power command $\mu_2$ and a voltage command E and for calculating a current magnitude command $I_i$ and an current phase angle command $\delta_i$ for the converter.

Figure 7:
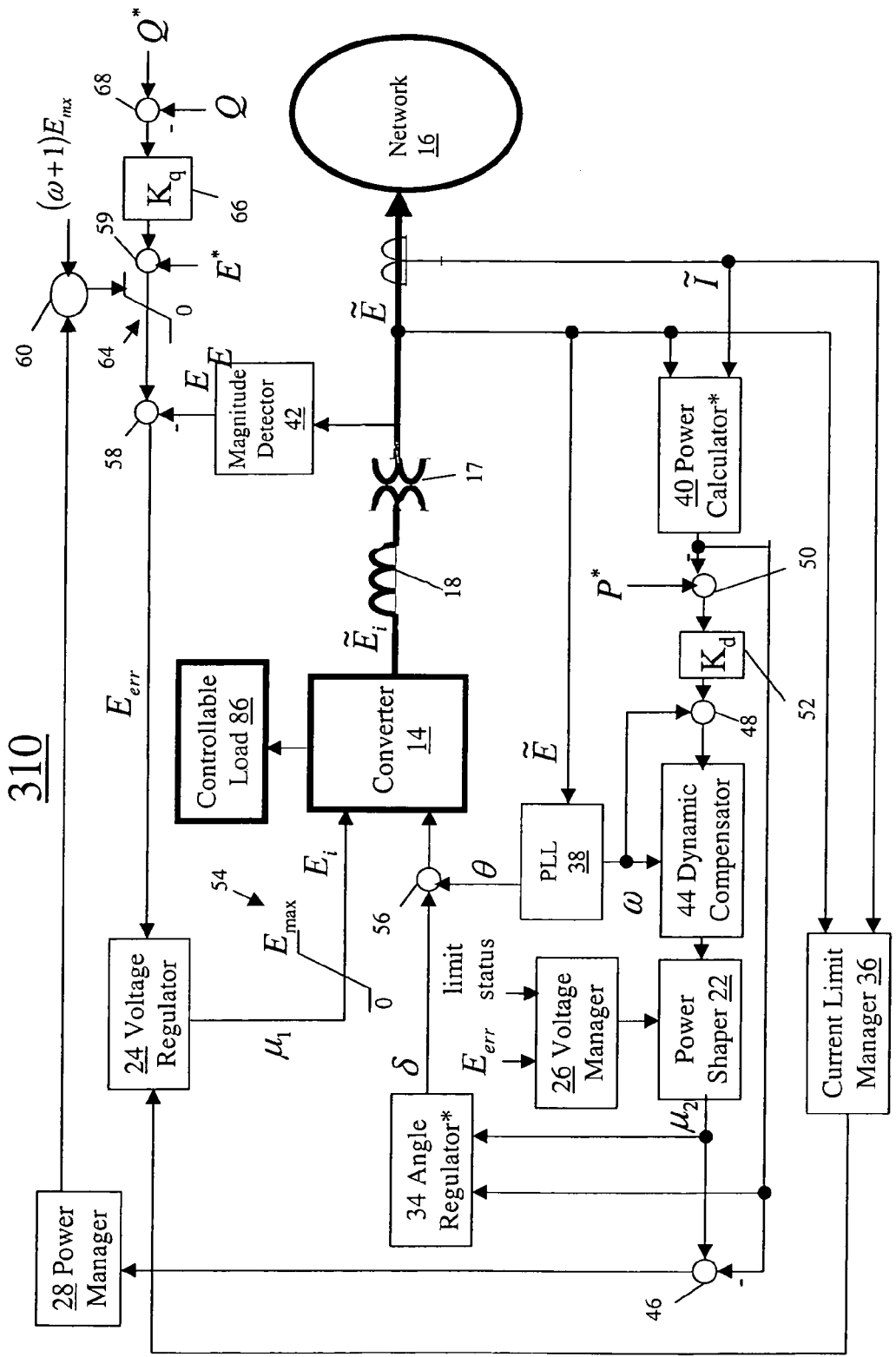
FIG. 7 is a block diagram of a power generation system in accordance with one embodiment wherein a load based control system is implemented.

FIG. 7 is a block diagram of a power generation system in accordance with one embodiment wherein a load based control system is implemented. As used herein, load based control system means the converter is connected to a load 86 rather than a source (such source 13 of FIG. 1, for example). This embodiment is also similar to the voltage based control embodiment. Several differences are that the converter sinks power (as compared with the supply of power as discussed above) and that a decreasing frequency will cause the power drawn from the system to decrease (rather than cause generated power to increase). Several examples of controllable loads include resistance heating, reverse osmosis desalinization, and hydrogen production equipment.

The above-described embodiments have various advantages. As several examples: induction motor loads in isolated networks can be started from severely constrained energy sources that otherwise could not start such motors; loads can be smoothly transitioned to grid independent operation without additional supervisory control; energy sources with diverse capabilities and limits can be paralleled without additional supervisory control; it is generally not necessary to know the detailed parameters of the network or loads for system stability; robust stability of the system can be maintained using a distributed control structure; the control concept can be easily integrated with energy storage for improved dynamic performance; and the resulting system will increase tolerance to network faults.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
   a converter configured for supplying power from a constrained power or energy source to a power network; and
   a control system configured as a voltage based control system and configured for balancing instantaneously available power from the constrained source against demanded load from the power network by supplying control signals to the converter for dynamically adjusting power network voltage and power network frequency such that the demanded load is transiently reduced when the demanded load exceeds the instantaneously available power from the constrained source,
   wherein the control system further comprises a power shaper configured to implement a power limit and a ramp-rate limit consistent with the capability of the constrained source and to provide a power command, an angle regulator configured for receiving the power command and generating an adjustment angle for adjusting a voltage phase angle command of the converter, a phase locked loop for obtaining a voltage angle estimation for following measured power network voltage with minimal steady state error, and a dynamic compensator configured to stabilize the phase locked loop when connected to weak grids or impedance networks.

2. The power generation system of claim 1 wherein the power network comprises a mini-grid and the mini-grid is further connected to a bulk power system.

3. The power generation system of claim 1, wherein the power generation system comprises a plurality of converters and the control system comprises a plurality of independent control systems, and wherein each converter is configured for being controlled by a respective one of the control systems.

4. The power generation system of claim 1 wherein the power network is coupled to multiple loads.

5. The power generation system of claim 1 wherein the phase locked loop is further configured for obtaining an offset frequency estimation and providing the offset frequency estimation to the power shaper.

6. The power generation system of claim 5 wherein the control system is configured for obtaining a frequency droop signal and further comprises a subtractor for subtracting the offset frequency estimation from the frequency droop signal and providing the result as an input to the dynamic compensator.

7. A power generation system comprising:
a converter configured for supplying power from a constrained power or energy source to a power network; and
a control system configured as a voltage based control system and configured for balancing instantaneously available power from the constrained source against demanded load from the power network by supplying control signals to the converter for dynamically adjusting power network voltage and power network frequency such that the demanded load is transiently reduced when the demanded load exceeds the instantaneously available power from the constrained source,
wherein the control system further comprises a power shaper configured to implement a power limit and a ramp-rate limit consistent with the capability of the constrained source and to provide a power command, an angle regulator configured for receiving the power command and generating an adjustment angle for adjusting a voltage phase angle command of the converter,
wherein the converter is configured for supplying power from the constrained source to the power network through a transformer, or a reactor, or both,
wherein the control system further comprises a voltage regulator configured to provide a terminal voltage magnitude command to the converter and to limit current in the converter by managing a voltage drop across the transformer, the reactor, or both, a voltage manager to reduce the power command when the measured terminal voltage magnitude cannot be driven to the voltage magnitude set point, a power manager configured to reduce the terminal voltage magnitude when calculated power from the network cannot be driven to the power command, and a summation element configured for combining an output signal of the power manager with a signal representative of a voltage set point multiplied by the frequency estimation of the network and for supplying the sum for use by the voltage regulator.

8. The power generation system of claim 7 wherein the control system further comprises a voltage droop signal, a summation element for adding the voltage droop signal to a voltage set point.

* * * * *

UNITED STATES PATENT AND TRADEMARK OFFICE
CERTIFICATE OF CORRECTION

PATENT NO. : 7,680,562 B2  Page 1 of 1
APPLICATION NO. : 11/221473
DATED : March 16, 2010
INVENTOR(S) : Delmerico et al.

It is certified that error appears in the above-identified patent and that said Letters Patent is hereby corrected as shown below:

On the Title Page, in item (56), under "U.S. PATENT DOCUMENTS", insert missing entry --4,700,081  *  10/1987  Kos et al. ... 290/44--.

On the Title Page, in item (56), under "U.S. PATENT DOCUMENTS", insert missing entry --2005/0057950  A1*  3/2005  Colby et al. ... 363/74--.

In Column 4, Line 43, delete "Eerr" and insert -- $E_{err}$ --, therefor.

Signed and Sealed this

Twenty-ninth Day of June, 2010

David J. Kappos
*Director of the United States Patent and Trademark Office*